United States Patent
Horiguchi et al.

[11] Patent Number: 5,324,926
[45] Date of Patent: Jun. 28, 1994

[54] OPTICAL CARD HAVING ALTERNATIVE INFORMATION RECORD REGION

[75] Inventors: Toshio Horiguchi, Hachioji; Kaori Ichikawa, Koganei, both of Japan

[73] Assignee: Olympus Optical Co., Ltd., Tokyo, Japan

[21] Appl. No.: 912,584

[22] Filed: Jul. 13, 1992

Related U.S. Application Data

[63] Continuation of Ser. No. 669,722, Mar. 15, 1991, abandoned.

[51] Int. Cl.$^5$ .................. G06K 19/06; G11B 7/007
[52] U.S. Cl. .......................... 235/494; 369/275.3
[58] Field of Search .......... 235/494, 454, 380, 487, 235/436, 437; 439/140; 369/275.3

[56] References Cited

U.S. PATENT DOCUMENTS

| | | | |
|---|---|---|---|
| 4,140,272 | 2/1979 | Atalla | 235/380 |
| 4,609,812 | 9/1986 | Drexler | 235/487 |
| 4,683,371 | 7/1987 | Drexler | 235/487 |
| 4,811,124 | 3/1989 | Dujari et al. | 369/59 |
| 4,868,806 | 9/1989 | Sakagami | 235/494 |
| 4,885,458 | 12/1989 | Horiguchi et al. | 235/454 |
| 4,924,199 | 5/1990 | Hashimoto et al. | 235/494 |
| 4,931,628 | 6/1990 | Wada | 235/454 |
| 4,958,339 | 9/1990 | Koyana et al. | 235/454 |

FOREIGN PATENT DOCUMENTS 2-116063 4/1990 Japan.

Primary Examiner—Davis L. Willis
Assistant Examiner—Edward Sikorski
Attorney, Agent, or Firm—Stevens, Davis, Miller & Mosher

[57] ABSTRACT

An optical card of write-once type including a rectangular card-like substrate on which a number of tracks (62) are formed in parallel with each other. In each track, one or more data record sectors (65) are provided and at the same time, one or more alternative information record sectors (66) are provided. When data could not be recorded correctly in a desired data sector in a desired track, the same data is recorded again in an alternative data sector. Then, in an alternative information record sector in the desired track, there in recorded alternative information representing an address of the alternative data sector. The alternative information record sector can be made much smaller than the alternative data sector, so that user area can be utilized efficiently as compared with a known optical card in which one or more alternative data sectors are previously provided. Moreover, the alternative information is recorded in a track in which the data could not be recorded correctly, the access time can be shortened materially as compared with a known optical card in which the alternative information is recorded in a directory track.

12 Claims, 9 Drawing Sheets

FIG_1
PRIOR ART
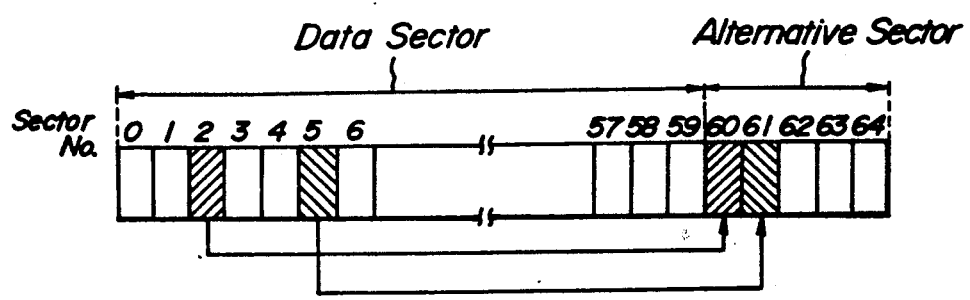
FIG_2
PRIOR ART
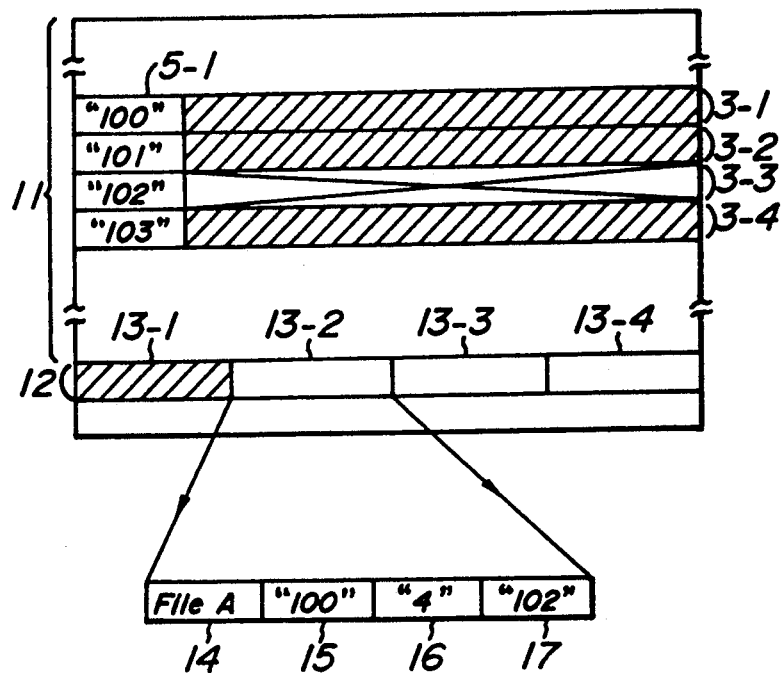

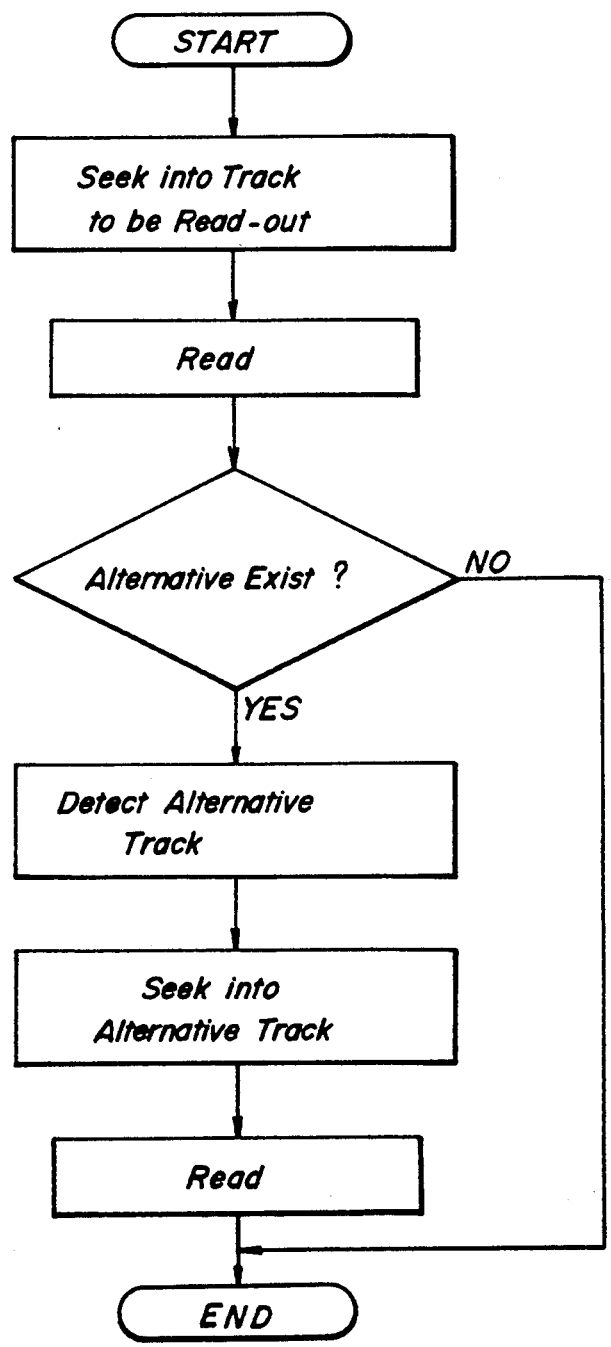
FIG_6

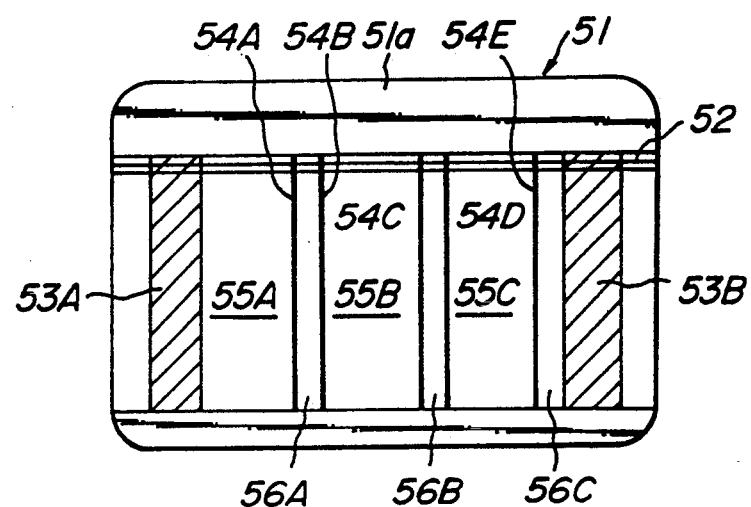
FIG_7
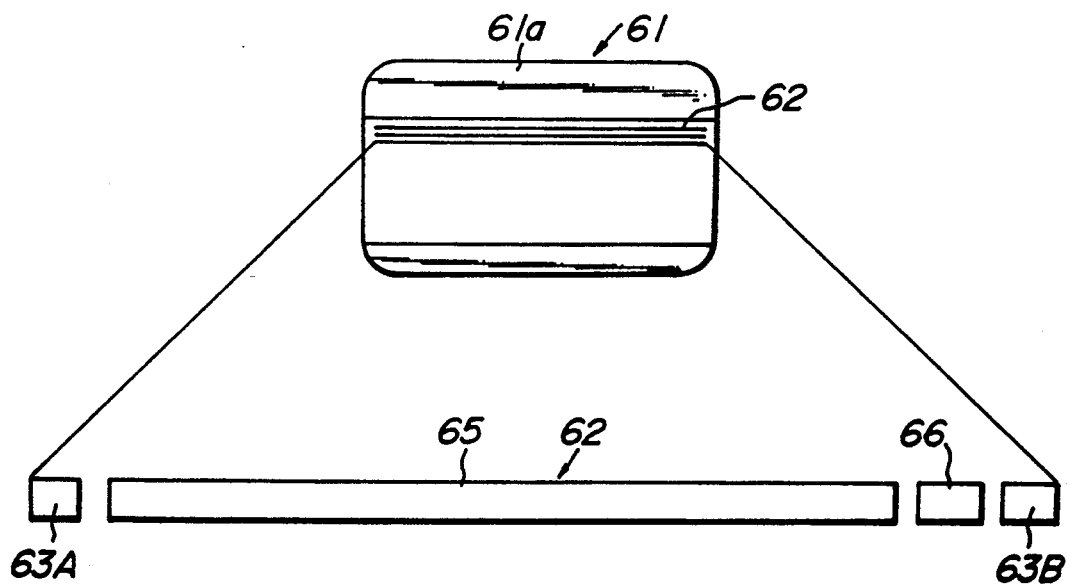
FIG_8

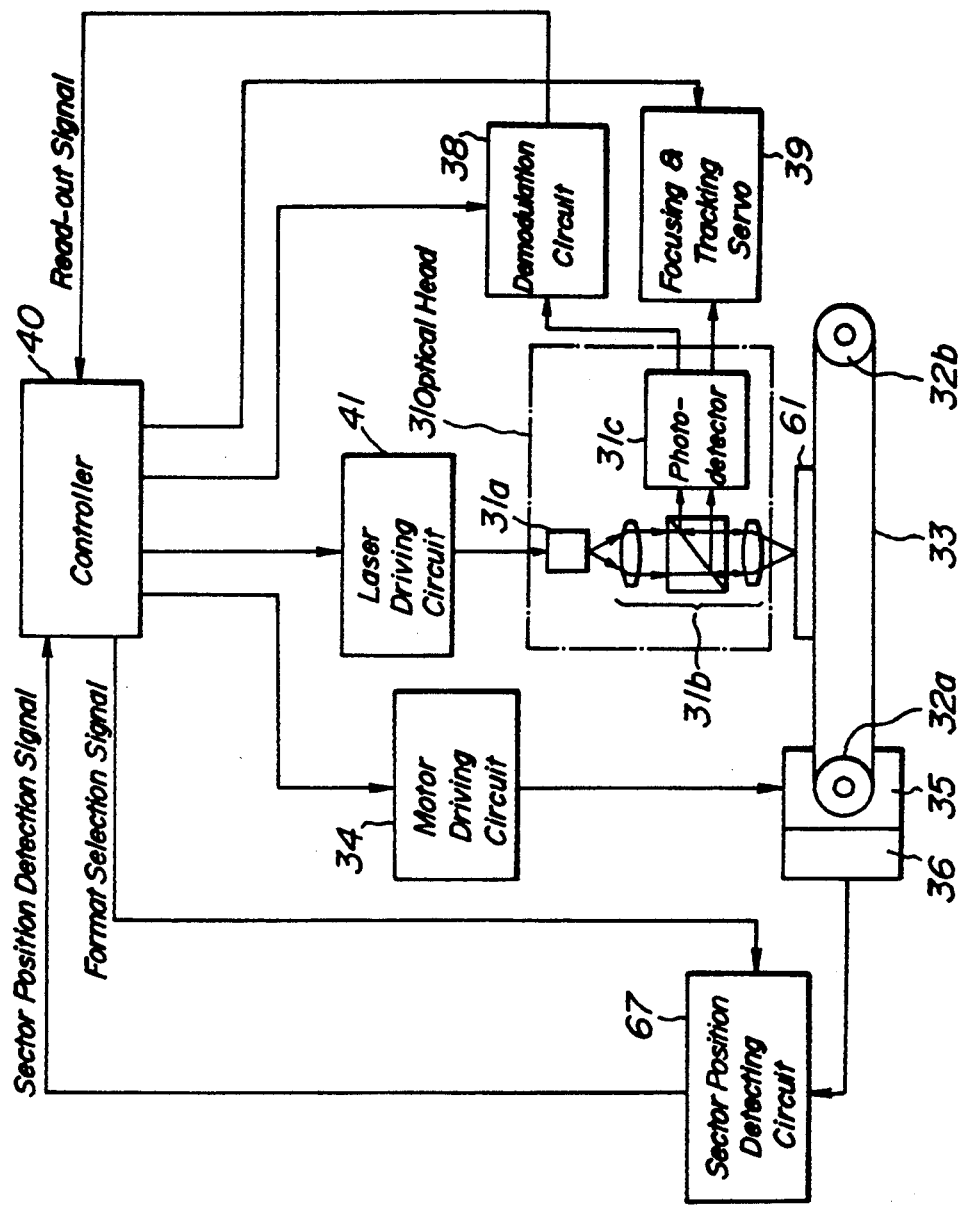
FIG_9

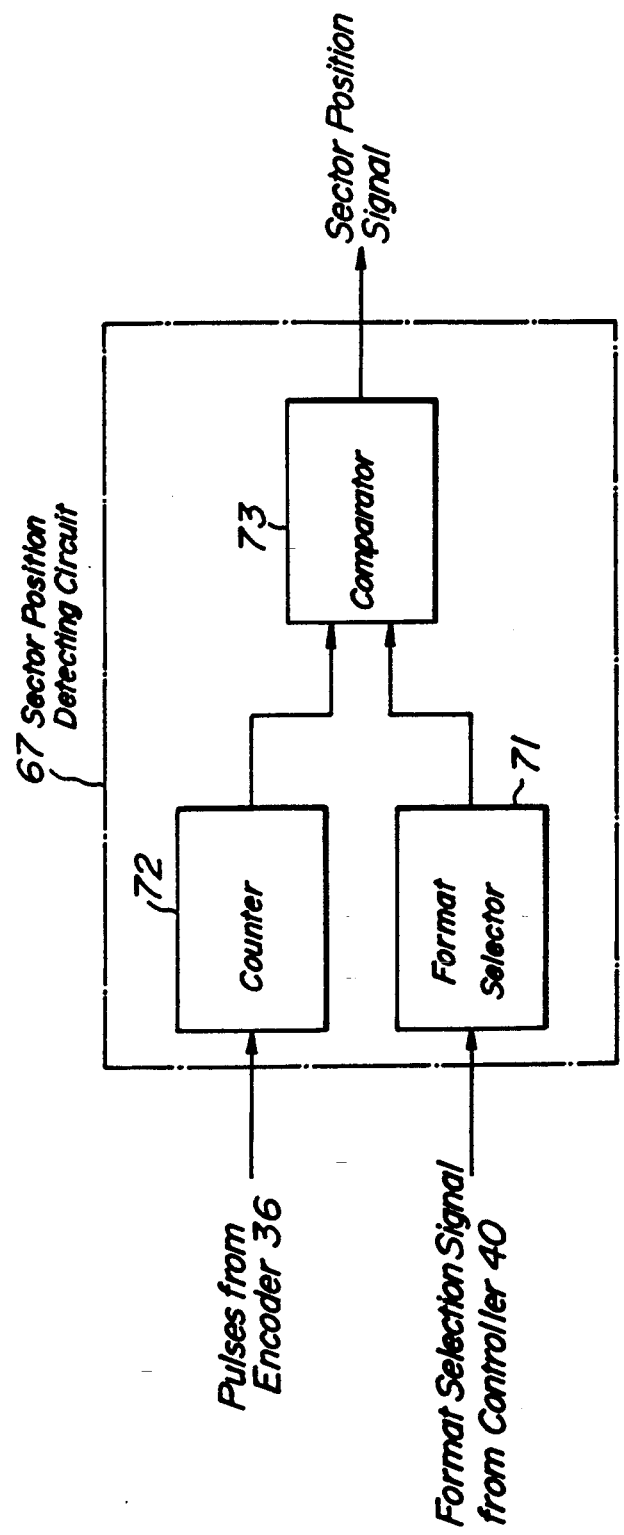

FIG_11
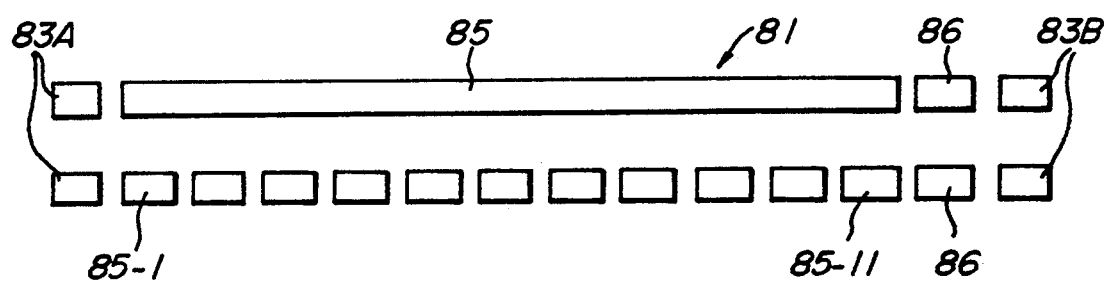

OPTICAL CARD HAVING ALTERNATIVE INFORMATION RECORD REGION

This application is a continuation of application Ser. No. 07/699,722, filed Mar. 15, 1991 (abandoned).

BACKGROUND OF THE INVENTION

FIELD OF THE INVENTION AND RELATED ART STATEMENT

The present invention relates to an optical card, and more particularly to an optical card of write-once type having alternative information record regions.

The optical card has a memory capacity larger than a magnetic card by several thousands to several ten thousands times, so that it may be used for various applications for recording bank booking data, maps, personal health data, etc. In usual optical cards, data could not be rewritten and an error rate due to defects on the optical card amounts to about $10^{-3}$ to $10^{-4}$, and therefore an error correction is indispensable. Further, sometimes the error correction could not be performed correctly depending upon magnitude or degree or defects, so that when data could not be recorded correctly in a data record region and the error correction could not be effected, the relevant data has to be recorded again in another data record region. This function is called the alternatively faculty. Usually the data is recorded in a sector of a track, and thus in the present specification, a sector in which data is recorded again is called an alternative sector and a track including such a sector is called an alternative track.

In Japanese Patent Application Laid-open Publication Kokai Sho 63-44,364, there is disclosed a method of effecting the above mentioned alternative faculty by using alternative sectors. In this known method, as illustrated in FIG. 1, in each track there are provided a plurality of data sectors (sector numbers 0 to 59) and a plurality of alternative sectors (sector numbers 60 to 64). When data is not written in a data sector with the error correction, the same data is written in an alternative sector. In this case, the alternative sectors having successively increasing or decreasing sector numbers are used in succession. In FIG. 1, a data sector of sector number 2 is altered by a first alternative sector having sector number 61 and a data sector of sector number 5 is altered by a second alternative sector having sector number 61. In data sectors which have been changed by alternative sectors there are provided marks by means of which these altered data sectors can be distinguished from other non-altered data sectors.

In this known method, in each of the tracks there are always provided the alternative sectors, and thus a user area in the track is limited materially. In the optical disk, since the memory capacity of a track is very large, the user area in the track is not reduced by the provision of the alternative sectors. However, in the optical card having a small size, the memory capacity of one track is about 1 kilo bytes and when the track is divided into a plurality of sectors, there can be provided only four sectors each having the memory capacity of 128 bytes. If one sector is allotted as the alternative sector, only three sectors are used for recording the data. In other words, in this known method, only 75% of the all the memory capacity can be used as the user area and the efficiency of utilization of the record area is very low.

In Japanese Patent Application Laid-open Publication Kokai Sho 61-243,994, there is described another known method for performing the alternative faculty. In this method, as shown in FIG. 2, when a track 3-3 has such a defect that data could not be written correctly in the relevant track, the same data is written again in a next track 3-4 and at the same time a track number "102" of the track 3-3 is written in a corresponding sub-area 13-2 in a directory region 12 together with file name 4 (File A), starting track number 15 ("100") of main data in which said data written in the track 3-3 is included, and total track number 17 ("4") in which the main data has been written.

This known method has the following two problems. Firstly, since the data which could not be written in a desired track due to defects is recorded in a next track, if there are very large defects such as large amounts of dust and damages which extend over two adjacent tracks, the data could not be recorded correctly in the next track. Then the alternative operation is repeated again, so that a recording time is liable to be prolonged. Secondly, in order to perform the alternative faculty even when the number of tracks in which data could not be recorded correctly due to damages and deteriorations of the optical card is increased, it is necessary to share a larger area for the sub-areas 13-1 to 13-4 shown in FIG. 2. Therefore, an area of the main data recording region is reduced accordingly. Particularly, when the track is divided into sectors or an amount of data of a single file is large, an amount of the alternative management information becomes extremely large, so that a large area has to be shared for the directory region 12.

In Japanese Patent Application Laid-open Publication Kokai Sho 63-103,476, there is proposed yet another known method, in which when data could not recorded correctly in a portion of a record medium due to defects on the record medium, the same data is recorded in an alternative portion and at the same time alternative management information denoting the above mentioned portion is recorded in a predetermined region on the record medium. Upon reading the record medium, at first the alternative management information recorded in the predetermined region is read out and an address of a portion to be read out is changed in accordance with the alternative management information.

In this known method, when the record medium is set on a data reading machine, all the data recorded in the alternative track management information is read out first, so that an initial processing time is liable to be longer. In the optical disk, the data transfer rate is high such as on the order of several hundreds kilo bits per second, so that the initial processing time becomes not so long. However, in the optical card, the data transfer rate is very low such as on the order of several kilo bits per second, because the data is read out by reciprocally moving the optical card with respect to an optical head. Therefore, if the number of alternative tracks becomes large, the initial processing operation requires 30 to 60 seconds. This results in a very long access time.

SUMMARY OF THE INVENTION

The present invention has for its object to provide a novel and useful optical card of write-once type, in which the alternative faculty can be performed in a positive and prompt manner without reducing the user area and increasing the access time.

According to the invention, an optical card of write-once type comprises:

a card-like substrate;

a plurality of tracks formed on said substrate and extending in parallel with each other in a track direction;

a plurality of data record regions each of which is provided in each respective tracks and is destined to record user data therein; and a plurality of alternative information record regions each of which is provided in each respective tracks and is destined to record therein alternative information representing a position of at least one alternative data record region.

In the optical card according to the present invention, in the alternative information record region in each track, there is recorded the alternative information denoting a position of an alternative sector, and a data amount of this alternative information is much smaller than an amount of user data. Therefore, a usable data record area in a track is reduced only by a limited amount as compared with the known optical card in which one or more alternative sectors are previously provided in each track. In this connection, it should be noted that in the optical card according to the invention, the alternative sector may be provided in the same track including the alternative information. Even in this case the user area of the optical card can be utilized efficiently. Further, the alternative information can be obtained when a track including at least one sector in which data could not be recorded correctly is read out, and thus the high speed access can be performed.

BRIEF DESCRIPTION OF THE DRAWINGS

FIG. 1 is a schematic view showing the track construction of a known optical card;

FIG. 2 is a schematic view illustrating the track construction of another known optical card;

FIGS. 5 and 6 are flow charts for explaining the operation of the apparatus illustrated in FIG. 4;

FIG. 7 is a plan view showing another embodiment of the optical card according to the invention;

FIG. 8 is a plan view illustrating a third embodiment of the optical card according to the invention;

FIG. 9 is a block diagram depicting an embodiment of the recording and reproducing apparatus using the optical card shown in FIG. 8;

FIG. 10 is a circuit diagram representing the detailed construction of the sector position detecting circuit of the apparatus of FIG. 9; and FIG. 11 is a schematic view showing the track format of still another embodiment of the optical card according to the invention.

DETAILED EXPLANATION OF THE PREFERRED EMBODIMENTS

Figure 3:
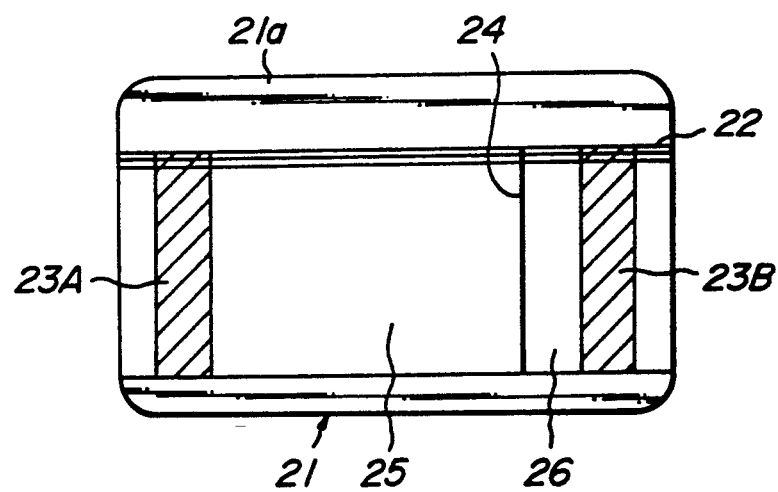
FIG. 3 is a plan view depicting an embodiment of the optical card according to the invention.

FIG. 3 is a plan view showing a first embodiment of the optical card according to the invention. An optical card 21 comprises a rectangular card-like substrate 21a made of relatively hard material. On the substrate 21a there are provided a plurality of tracks 22 which extend in parallel with each other in a longitudinal direction of the substrate. At both ends of the tracks 22 there are provided ID (identification) regions 23A and 23B, in which track addresses are pre-recorded. User areas in the tracks 22 are divided into data record regions 25 and alternative information record regions 26 by means of a sector mark 24. That is to say, in the present embodiment, in each track 22, the data record region 25 is consisting of a single data record sector and the alternative information record region 26 is also consisting of a single alternative information record sector. Usually data is recorded in a data record region 25 of a predetermined track 22, but when the data is not recorded correctly in the predetermined track due to defects on the optical card 21, the same data is recorded in a data record region of another track and alternative information denoting the alternative track address is recorded in an alternative information record region 26 of the former track.

In the present embodiment, each track 22 comprises a single data record region 25, i.e. a single data record sector, so that in the alternative information record sector, it is sufficient to record only an address of a track including an alternative data record region as explained above. For instance, the sector 25 is formed to have a memory capacity of a sum of 512 bytes of user data and an error correction code, and the alternative information record region 26 is formed to have a memory capacity of a sum of 2 bytes of a track address and an error correction code. In the optical card, the error rate is very high such as $10^{-3}$ to $10^{-4}$, so that the extensive error correction code has to be used. For instance, the error correction code amounting to 30 to 40% of the user data of 512 bytes has to be added to the user data recorded in the data record region 25 and the error correction code for the track address of 2 bytes should have 22 bytes. When the error correction code for the user data amounting to 40% of the user data is used, all the data in the data record region 25 amounts to about 720 bytes and all the data in the alternative information record region 26 amounts to 24 bytes. It is apparent that the ratio of the alternative information record region 26 to the total data record region 25, 26 is very small, and thus the reduction of the user area due to the provision of the alternative information record region 26 is very small. That is to say, the memory capacity of the alternative information record region 26 is smaller than that of the data record region 25 by about thirty times. In this manner, in the optical card according to the invention, a large user area can be utilized for recording the user data.

Figure 4:
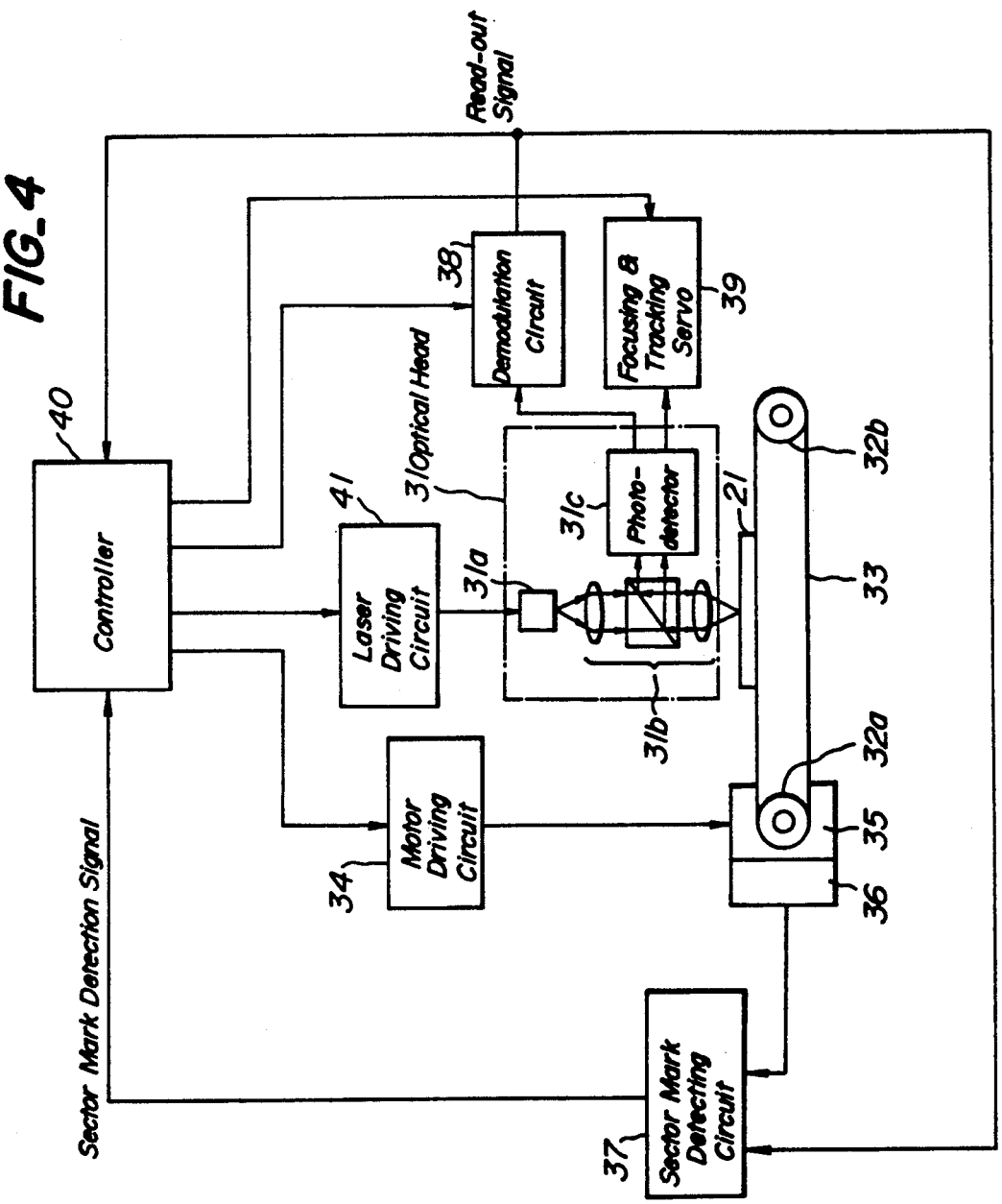
FIG. 4 is block diagram representing an embodiment of the recording and/or reproducing apparatus using the optical card shown in FIG. 3.

FIG. 4 is a block diagram depicting an embodiment of the recording and reproducing apparatus using the optical card 22 shown in FIG. 3. In the present embodiment, the data recording and reproducing are carried out by moving the optical card 21 in a track direction in which the tracks 22 extend and moving an optical head 31 in a direction perpendicular to the track direction. The optical card 21 is placed on an endless belt 33 wound around pulleys 32a and 32b. The pulley 32a is driven by a motor 35 which is driven by a motor driving circuit 34, so that the optical card 21 is moved reciprocally in the track direction with respect to the optical head 31. A rotary encoder 36 is coupled with the motor 35 and a position of the optical card 21 with respect to the optical head 31 is detected by processing pulses generated by the rotary encoder. The pulses are supplied to a sector mark detecting circuit 37.

The optical head 31 includes a laser diode 31a for emitting a laser beam, an optical system 31b for projecting the laser beam upon the optical card 21 and a photodetector 31c for receiving a light beam reflected by the optical card by means of the optical system. An output signal generated by the photodetector 31c is supplied to a demodulation circuit 38 to reproduce a read-out signal. The output signal of the photodetector 31c is also supplied toa focusing and tracking servo circuit 39 to detect focusing and tracking error signals. The optical head 31 is moved in the focusing and tracking directions in accordance with said focusing and tacking error signals such that the light beam is made incident upon a given position of the optical card 21 in the in-focused condition.

The read-out signal is supplied to a controller 40 for restoring the data signal and track address information, and also supplied to the sector mark detecting circuit 37 for detecting the sector mark 24. When the sector mark is detected, a detection signal is supplied to the controller 40.

In case of reproducing the data recorded on the optical card 21, the controller 40 energizes the laser diode 31a by means of a laser driving circuit 41 to emit a reproducing light beam having a relatively low power. Further the controller 40 controls the motor driving circuit 34, demodulation circuit 39 and focusing and tracking servo circuit 39 to effect the track seek for accessing the optical head 31 onto a desired track 22 on the optical card 21 on the basis of the track information reproduced by the demodulation circuit 38. In the data recording operation, after a desired track has been sought in the manner explained above, the controller 40 energizes the laser diode 31a by means of the laser driving circuit 41 to emit a recording laser beam having a relatively high power. It should be noted that the intensity of the recording laser beam is modulated in accordance with the data to be recorded.

Now the operation of the recording and reproducing apparatus shown in FIG. 4 will be explained.

Figure 5:
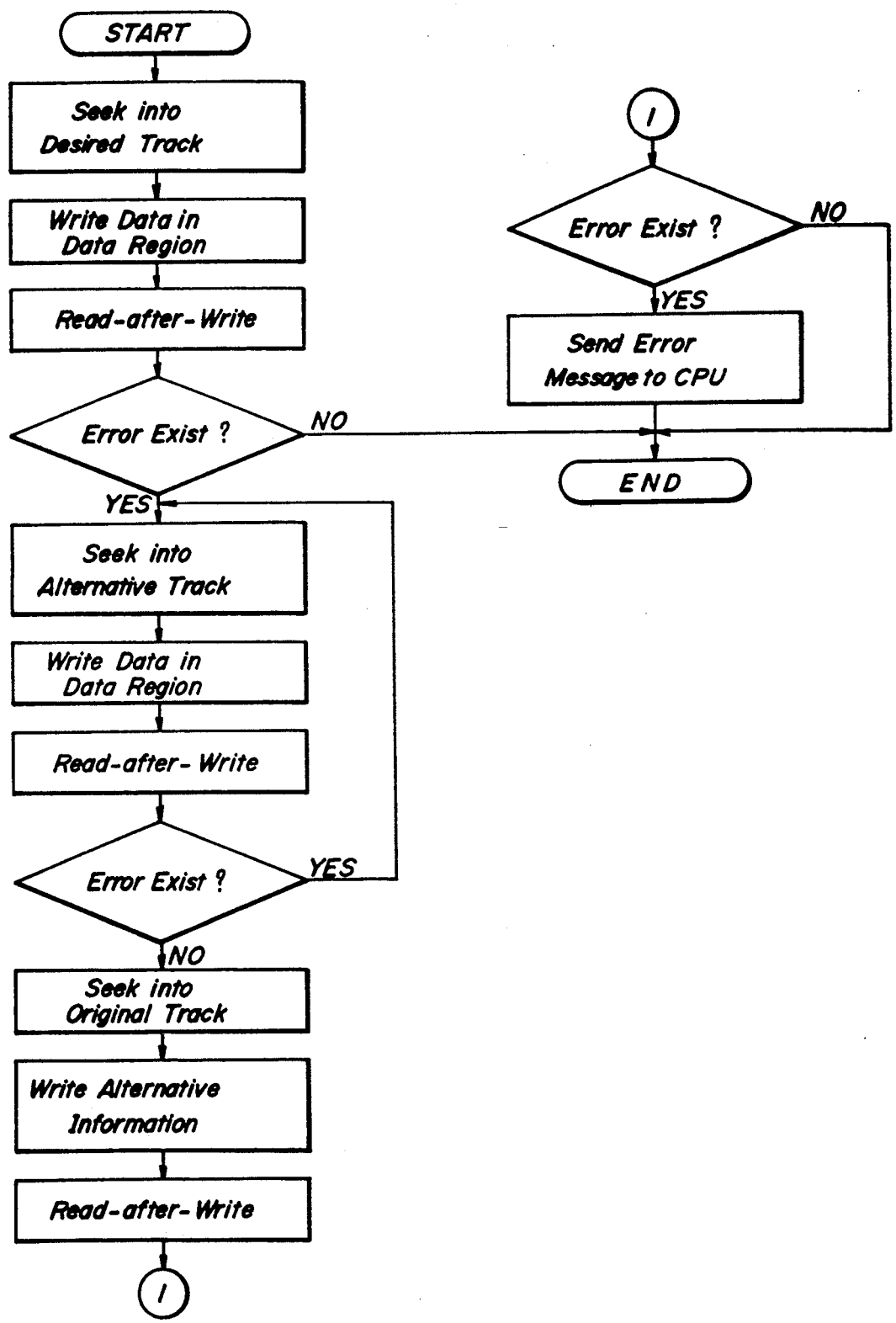

FIG. 5 is a flow chart representing the operation of recording the data on the optical card. At first, the optical head 31 is moved in the direction perpendicular to the track direction to effect the seek and is indexed at a desired track in which data is to be recorded. Then, the data is recorded in the data record region 25 of the relevant track. Next, the thus recorded data in the data record region 25 is read out (read-after-write), and it is checked whether or not the recorded data includes error which could not be corrected. If there is no error, the program is ended. But when the error which could not be corrected is detected, the optical head 31 is sought into an alternative track which is predetermined by a system program. Then, the same data is recorded again in the data record region 25 of the alternative track. After that, the recorded data is read out to check whether or not error is existent. This alternative operation is repeated until the data is recorded without error. When the data has been checked to be recorded correctly, the optical head 31 is returned into the first track in which the data could not be recorded correctly, and then alternative information consisting of an address of the last track in which the data has been recorded correctly and an error correction code is recorded in the alternative information record region 26. Next, the alternative information recorded in the alternative information record region 26 is read out to check whether or not the alternative information could be recorded correctly. If the error is detected, an error massage denoting the error in the alternative information is sent to a host computer. In this case, the host computer performs a system error process and the recording operation is interrupted.

FIG. 6 is a flow chart illustrating the reproducing operation. At first, the optical head 31 is sought into a desired track from which data is to be read out. Then, the data recorded in the data record region 25 and alternative information record region 26 is read out. Then, it is judged whether or not the alternative information is recorded in the alternative information record region 26. When the alternative information is not read out, i.e. when the data has been correctly recorded in the data record region 25 of the relevant track 22, the data reproduction is ended. But when the alternative information is read out, the alternative track is detected with the aid of the alternative information and then, the optical head 31 is sought into the alternative track. The data recorded in this alternative track is read out and it is judged whether or not the alternative information is recorded. When the alternative information is detected, the above operation is repeated. When the alternative information is not detected, the reproducing operation is ended.

In the manner explained above, by using the optical card 21 shown in FIG. 3, the alternative operation can be performed without reducing the user data area to a large extent and the initial processing time upon the reproduction can be made zero even if only one sector is provided in a track.

FIG. 7 is a plan view showing a second embodiment of the optical card according to the invention. In this embodiment, an optical card 51 comprises a rectangular card-like substrate 51a on which a number of tracks 52 are provided in parallel with each other and ID regions 53A and 53B are pre-recorded at both ends of the tracks. A user area between these ID regions 53A and 53B are divided into three data record sectors 55A, 55B and 55C and three alternative information record sectors 56A, 56B and 56C by means of sector marks 54A to 54E. When data could not be recorded correctly in a data record sector (for instance, 55B), alternative information is recorded in an alternative information record sector (56B) which directly follows said data record sector. In the present embodiment, the data record region is consisting of the three data record sectors and the alternative information record region is also consisting of the three alternative information record sectors.

In the optical card 51, there are provided 2500 tracks at most, so that the alternative information may be consisting of a track address of 12 bits and a sector address of 2 bits. Therefore, when one byte is consisting of 8 bits, the alternative information may be consisting of only two bytes. Then, each of the alternative information record sectors 56A to 56C amounts to 24 bytes including the error correction code. Further in each of the data record sectors 55A to 55C, it is possible to record data of about 200 bytes including the user data of 128 bytes and the error correction code amounting to 40% of the user data. Therefore, in the present embodiment, although each track 52 contains three data record sectors 55A to 55C and three alternative information record sectors 56A to 56C, the alternative faculty can be realized without reducing the user data area to a large extent. The recording and reproducing operations using the optical card 51 can be performed in similar manners to those explained above with reference to flow charts shown in FIGS. 5 and 6.

In the present embodiment, an alternative data record sector is selected from a track other than an original track in which data could not be recorded correctly. According to the invention, it is also possible to select the alternative data record sector from the original track if the original track still includes at least one empty data record sector. Even in this case, the user area can be utilized in an efficient manner as compared with the known optical card in which one or more alternative sectors are previously provided in each track.

In the above mentioned embodiments, the alternative information includes an address of an alternative track, but according to the invention the alternative information may include a difference between an address of an alternative track and an address of an original track in which data could not be recorded correctly.

In the embodiments so far explained, the alternative information record region in each track is separated from the data record region by the sector mark and a plurality of data sectors provided in each track are separated by the sector marks, but according to the invention it is not always necessary to provide such sector marks.

FIG. 8 is a schematic view showing the track construction of a third embodiment of the optical card according to the invention. An optical card 61 comprises a rectangular card-like substrate 61a on which a number tracks 62 are provided in parallel with each other. At both ends of the track 61 are provided prerecorded ID regions 63A and 63B, and a data record region 65 and an alternative information record region 66 are provided in a user area between these ID regions. In the present embodiment, the data record region 65 is consisting of a single data record sector and the alternative information record region 66 is also consisting of a single alternative information record sector. In FIG. 8, the data record region 65 and alternative information record region 66 are separated from each other not by a sector mark, but by a blank area. The length of the blank area is so determined that the superimposition in data writing due to the variation of the feeding speed of the optical card can be avoided. If new data is written by detecting the last bit of previously recorded data, the blank area may be omitted. The data record region 66 has a memory capacity of a sum of 1024 bytes and an error correction code, and the alternative information record region 66 has a memory capacity of a sum of 32 bytes and an error correction code. That is to say, the memory capacity of the data record region 65 is larger than that of the alternative information record region 66 by about thirty times.

FIG. 9 is a block diagram illustrating an embodiment of the recording and reproducing apparatus using the optical card 61 shown in FIG. 8. The construction of the apparatus of the present embodiment is substantially the same as that of the embodiment depicted in FIG. 4, so that portions similar to those of the embodiment of FIG. 4 are denoted by the same reference numerals used in FIG. 4. In the present embodiment, a sector position detecting circuit 67 is provided instead of the sector mark detecting circuit 37 in FIG. 4. The pulses generated by the rotary encoder 36 are supplied to the sector position detecting circuit 67 to which a format selection signal is supplied from the controller 40. By processing the pulses and format selection signal the sector position detecting circuit 67 can detects a start point of a sector.

FIG. 10 is a circuit diagram showing an embodiment of the sector position detecting circuit 67. The sector position detecting circuit 67 comprises a format selector 71 for generating predetermined count values denoting start points of the data record region 65 and alternative information record region 66 in accordance with the format selection signal supplied from the controller 40. The sector position detecting circuit 67 further comprises a counter 72 for counting the pulses generated by the rotary encoder 36, and a comparator 73 for comparing the predetermined count values supplied from the format selector 71 and a count value of the counter 72 with each other and producing sector position signals when these count values become identical with each other. The counter 72 is reset when the optical head 31 comes into a predetermined point on the optical card 61 such as an edge of the optical card. In this case, the predetermined count values correspond to distances between the edge of the optical card and the start points of the data record region 65 and alternative information record region 66. In the present embodiment, the optical card 61 is moved reciprocally in the track direction, so that the format selector 71 can generate two sets of predetermined count values, and when the optical card 61 is moved in a forward direction, a first set of predetermined count values are supplied to the comparator 73 and when the optical card is moved in a backward direction, a second sets of predetermined count values is effected by comparator. The selection of these first and second sets of predetermined count values is effected by detecting the moving direction of the optical card, and this can be performed simply by detecting the driving signal for the motor 35.

Now the operation for recording the data on the optical card 61 shown in FIG. 10 will be explained. At first, the controller 40 supplies the format selection signal of a desired track in which data is to be recorded to the sector position detecting circuit 67. For instance, the format selection signal consisting of a code 01H is sent from the controller 40 to the sector detecting circuit 67. Then, the optical head 31 is moved in the direction perpendicular to the track direction into a given track. Next, the optical card 61 is moved in the track direction to read out the ID region 63A or 63B. That is to say, when the optical card is moved in the forward direction, the ID region 63A is read out to find a track address recorded therein, and when the optical card is moved in the backward direction, the ID region 63B is read out to find the track address. When the read out track address is identical with the track address of the desired track, the optical card is further moved to record the data in the data record region 65, while the sector position is detected by the sector position detecting circuit 67 by counting the pulses generated by the rotary encoder 36 and comparing the count value with a predetermined count value. The sector detection signals generated by the sector position detecting circuit 67 are counted in the controller 40 and when the count value becomes identical with the number of a desired sector, the data is recorded in the desired sector. In the present embodiment, since only one sector is provided in the data record region 65, when the sector position detecting circuit 67 produces only one sector detection signal, the data recording operation is carried out.

Next, the operation for recording and reproducing the alternative information will be explained. In this case, a format of 32 user bytes is selected as the track format, and a code 02H is sent to the sector position detecting circuit 67 as the format selection signal. Then, the optical head 31 is sought into a predetermined alternative track by reading the ID regions 63A or 63B.

Then the optical card 61 is moved in the track direction to count the sector position detection signals. When the count value becomes equal to 12 in the forward movement and when the count value becomes identical with 1 in the backward movement, the alternative information is recorded or reproduced.

In the embodiment illustrated in FIG. 8, the alternative information record region 66 is provided on the right hand side of the data record region 65, but the former region may be provided on the left hand side of the later region. Moreover, a plurality of sectors may be provided in each data record region. In this case, a plurality of alternative information record regions may be provided in each track like as the embodiment shown in FIG. 7. Further the number of the sectors in a track may be different from that of the alternative information record regions. For instance, three data sectors and one alternative information record region may be provided in each track, or one data sector and three alternative information record regions may be provided in each track.

FIG. 11 is a schematic view illustrating the track format of still another embodiment of the optical card according to the invention. In the present embodiment, there is not recorded any sector mark between the sectors, and any track formats can be selectively used. As shown in FIG. 11, an upper track 82 is consisting of ID regions 83A, 83B, a single data record sector 85 and a single alternative information record sector 86, and a lower track is consisting of ID regions 83A, 83B, eleven data sectors 85-1 to 85-11 and a single alternative information record sector 86. In this embodiment, the alternative information record sector 86 is formed to have the same memory capacity as that of each of the data record sectors 85-1 to 85-11. For instance, each of the data record sectors 85-1 to 85-11 and the alternative information record sector 86 has the memory capacity of a sum of 32 bytes and error correction code, while the long data record sector 85 has a memory capacity of a sum of 1024 bytes and an error correction code. In this embodiment, the memory capacity of all the data record sectors 85-1 to 85-11 becomes smaller that that of the long data record sector 85. However, if a length of unit data which should be recorded in a single sector is short, the data record efficiency becomes high. In other words, in the present embodiment, the memory capacity of a data record sector can be changed in accordance with a length of data to be recorded in a single data record sector, so that the user area in the optical card can be utilized in an optimum manner.

As explained above in detail, in the optical card according to the present invention, the alternative information record region is provided in each respective track, so that a data amount of the alternative information can be made very much smaller than a data amount of the user data, the alternative faculty can be attained without decreasing the user area to a large extent. Moreover, the alternative information can be obtained by reading a track including the data region in which the data could not be correctly recorded, and therefore the initial processing time is not required at all and the access time can be shortened materially.

What is claimed is:

1. An optical card of write-once type comprising:
    a card-like substrate;
    a plurality of tracks formed on said substrate and extending in parallel with each other in a track direction;
    a plurality of sectors containing an identification region and a data record region, each of said sectors being provided in a respective one of said tracks and being employed to record user data therein; and
    a plurality of alternative information record regions each of which is (i) positioned outside a region defined by any of said sectors, (ii) provided in a respective one of said tracks and (iii) employed to record therein alternative information representing a position of at least one alternative data record region, each of said tracks comprising at least one of said sectors and at least one of said alternative information record regions.

2. An optical card according to claim 1, wherein in each track said data record region and said alternative information record region are arranged continuously.

3. An optical card of write-once type comprising:
    a card-like substrate;
    a plurality of tracks formed on said substrate and extending in parallel with each other in a track direction;
    a plurality of sectors containing an identification region and a data record region, each of said sectors being provided in a respective one of said tracks and being employed to record user data therein; and
    a plurality of alternative information record regions each of which is (i) positioned outside a region defined by any of said sectors, (ii) provided in a respective one of said tracks and (iii) employed to record therein alternative information representing a position of at least one alternative data record region, each of said tracks comprising at least one of said sectors and at least one of said alternative information record regions, wherein in each track said data record region and said alternative information record region are separated by a blank area.

4. An optical card of write-once type comprising:
    a card-like substrate;
    a plurality of tracks formed on said substrate and extending in parallel with each other in a track direction;
    a plurality of sectors containing an identification region and a data record region, each of said sectors being provided in a respective one of said tracks and being employed to record user data therein; and
    a plurality of alternative information record regions each of which is (i) positioned outside a region defined by any of said sectors, (ii) provided in a respective one of said tracks and (iii) employed to record therein alternative information representing a position of at least one alternative data record region, each of said tracks comprising at least one of said sectors and at least one of said alternative information record regions, wherein in each track, said data record region and said alternative information record region are separated by a sector mark.

5. An optical card according to claim 4, wherein in each track, said data record region consists of a single data record sector and said alternative information record region consists of a single alternative information record sector.

6. An optical card according to claim 5, wherein said alternative information record sector is formed to have a memory capacity which is much smaller than that of the data record sector.

7. An optical card according to claim 4, wherein in each track, said data record region consists of a plurality of data record sectors and said alternative information record region consists of a plurality of alternative information record sectors.

8. An optical card according to claim 7, wherein in each track, each of said plurality of alternative information record sectors is adjacent to each of said plurality of data record sectors.

9. An optical card according to claim 7, wherein each of said alternative information record sectors is formed to have a memory capacity which is much smaller than that of each of said data record sectors.

10. An optical card according to claim 4, wherein in each track, said data record region consists of a plurality of data record sectors and said alternative information record region consists of a single alternative information record sector.

11. An optical card according to claim 10, wherein said plurality of data record sectors are arranged in succession to form an array of data record sectors and said single alternative information record sector is arranged on one side of said array of data record sectors.

12. An optical card according to claim 11, wherein said alternative information record sector is formed to have the same memory capacity as that of each of said data record sectors.

* * * * *